United States Patent
Aggarwal et al.

(10) Patent No.: US 7,484,242 B2
(45) Date of Patent: ***Jan. 27, 2009

(54) ENABLING USER CONTROL OVER AUTOMATED PROVISIONING ENVIRONMENT

(75) Inventors: Vijay Kumar Aggarwal, Austin, TX (US); David Werner Bachmann, Leander, TX (US); Uzi Hardoon, Golden Beach, FL (US); Craig M. Lawton, Raleigh, NC (US); Raymond P. Pekowski, Austin, TX (US); Christopher Andrew Peters, Round Rock, TX (US); Puthukode G. Ramachandran, Austin, TX (US); Lorin Evan Ullmann, Austin, TX (US); John Patrick Whitfield, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 649 days.

This patent is subject to a terminal disclaimer.

(21) Appl. No.: 10/942,421

(22) Filed: Sep. 16, 2004

(65) Prior Publication Data

US 2006/0056618 A1     Mar. 16, 2006

(51) Int. Cl.
*H04L 9/32*     (2006.01)
(52) U.S. Cl. .............................................. 726/7; 705/8
(58) Field of Classification Search ....................... None
See application file for complete search history.

(56) References Cited

U.S. PATENT DOCUMENTS

| | | | |
|---|---|---|---|
| 6,463,345 B1 * | 10/2002 | Peachey-Kountz et al. | .... 700/99 |
| 7,254,645 B2 * | 8/2007 | Nishi | .......................... 709/249 |
| 2004/0181476 A1 * | 9/2004 | Smith et al. | .................... 705/35 |

* cited by examiner

*Primary Examiner*—Pramila Parthasarathy
(74) *Attorney, Agent, or Firm*—Casimer K. Salys; Anthony V S England; Joseph P. Lally

(57) ABSTRACT

Enabling automated provisioning on a data processing network includes providing the network with access to an automated provisioning controller. The controller enables a user to specify resource allocation priorities and uses the user-specified priorities, in conjunction with a resource stabilization policy, to resolve conflicting resource requests. The resource allocation priorities include priorities for demand-based resource requests and maintenance-based resource requests. The stabilization policy includes a policy for constraining allocation of a resource based on forecasted demand and a policy for constraining allocation of a resource based on a scheduled maintenance task.

20 Claims, 5 Drawing Sheets

ENABLING USER CONTROL OVER AUTOMATED PROVISIONING ENVIRONMENT

BACKGROUND

1. Field of the Present Invention

The present invention is in the field of data processing networks and, more particularly, data processing networks in which resources from a pool of available resources are dynamically allocated as needed.

2. History of Related Art

In the field of information technology (IT), provisioning is an increasingly important concept. Provisioning, as the term is used in this disclosure, refers to functionality that enables an environment such as a data center to allocate IT resources as they are needed. In a fully automated provisioning implementation, a data center may respond to variations in load by allocating and deallocating servers to a particular server cluster.

A web server cluster, for example, may require more servers during peak demand periods (such as when consumers are likely to be accessing the cluster) while a database server cluster may be configured to execute the bulk of its tasks at other times. In this scenario, provisioning may include allocating servers from a pool of available server resources to the web server cluster during normal business hours, deallocating some servers from the web server cluster after hours, and allocating server resources to the database server cluster during off hours.

This simple example illustrates a primary benefit of provisioning, namely, dynamic allocation of resources to conserve the amount of total resources required. Instead of configuring the database server cluster with sufficient server resources to handle the peak database workload and the web server cluster with sufficient server resources to handle the peak web server workload, the total resources required are reduced by using server capacity more efficiently. In addition, automated provisioning reduces the amount of time and human effort required to configure resources for a particular task and thereby reduces management overhead.

While automated data provisioning is a theoretically desirable goal, customers are justifiably wary of automated provisioning implementations. Regardless of the level of automation, customers tend to desire a mechanism by which they can monitor or control the manner in which the automation is deployed. It would be desirable, therefore, to implement an automated provisioning environment and user interface that enabled an administrator to monitor and control automated provisioning activity.

Provisioning as it has generally been implemented to date, is devoted more or less exclusively to core provisioning tasks, namely, allocation of resources in response to fluctuating demand or loading. IT administrators recognize, however, that other activities such as maintenance tasks and reservation requests (for developmental testing as an example), must be accommodated and that these activities have generally been handled through ad hoc and manual resource re-allocation. It would be desirable, therefore, if the implemented automated provisioning solution encompassed not only the traditional provisioning tasks, but also resource-consuming activity that has not been previously considered together with core resource provisioning activity.

In addition, a concern with automated provisioning implementations involves the concept of stabilization. Stabilization, as it suggests, refers to the stability of a particular resource allocation state. Illustrating with a simple example, stabilization concerns would advise against allocating a currently available server to a particular customer application when it is known that the server is scheduled for mandatory maintenance. Similarly, stabilization policies might prevent re-allocation of a resource from a first application to a second application when it can be predicted from historical data that the first application will soon experience a demand surge. In the absence of at least some stabilization policies, automated provisioning may result in provision "thrashing" in which resources are being allocated and re-allocated frequently and the provisioning overhead associated with each re-allocation tends to mitigate, if not entirely negate, any benefit provided. Whereas, conventional automated provisioning systems do not adequately recognize or accommodate provisioning policies, it would be desirable to implement an automated provision system that fully embraced provisioning concerns and enabled the integration of provisioning policies into the provisioning domain.

SUMMARY OF THE INVENTION

The indicated goals are achieved in the present invention by enabling automated provisioning on a data processing network including providing the network with access to an automated provisioning controller. The controller enables a user to specify resource allocation priorities and uses the user-specified priorities, in conjunction with a resource stabilization policy, to resolve conflicting resource requests. The resource allocation priorities include priorities for demand-based resource requests and maintenance-based resource requests. The stabilization policy may include a policy for constraining allocation of a resource based on forecasted demand and a policy for constraining allocation of a resource based on a scheduled maintenance task.

BRIEF DESCRIPTION OF THE DRAWINGS

Other objects and advantages of the invention will become apparent upon reading the following detailed description and upon reference to the accompanying drawings in which.

Figure 1:
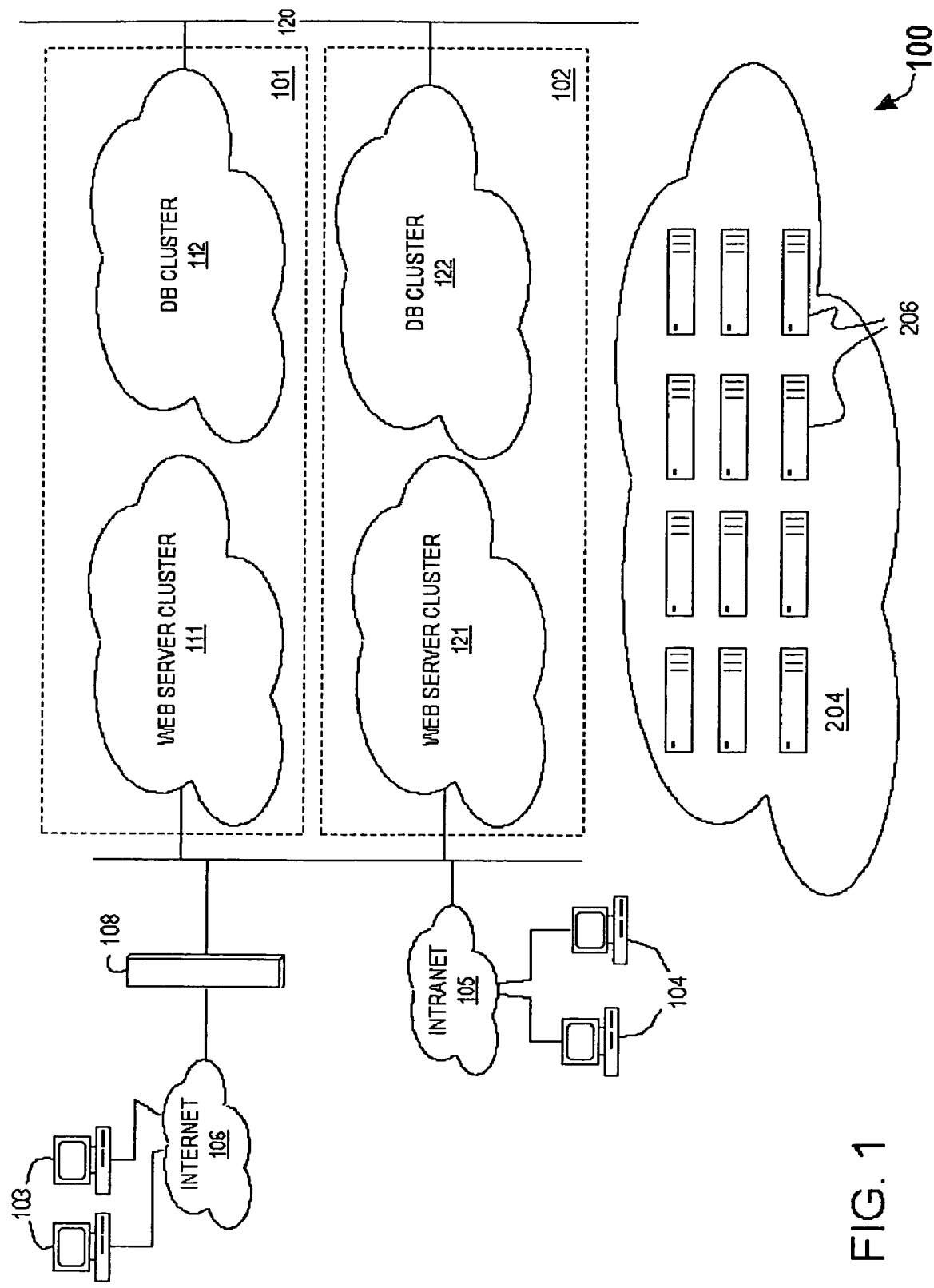
FIG. 1 is a diagram of selected elements of a data center according to an embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention facilitates automated resource provisioning in a data center or other networked environment by providing administrators with access to an interface that enables them to prioritize the manner in which resource request conflicts are resolved and to otherwise control the automated provisioning implementation. The invention encompasses traditional provisioning tasks such as processing load-based resource requests, but also includes facilities to accommodate other important resource requests that have traditionally been outside the framework of the conventional automated provisioning paradigm. When resource request conflicts occur, an automated provisioning controller resolves the conflicts automatically based on specified priority indicators and conflict resolution policies. The provisioning controller recognizes stabilization policies that may further guide the servicing and prioritization of resource requests by placing constraints on allocation actions.

Turning to the drawings, FIG. 1 is a diagram of selected elements of a data center 100 according to one embodiment of the present invention. In the depicted embodiment, data center 100 includes two applications, each having its own web server cluster and database cluster. Specifically, network 100 as depicted includes a first application 101 having a first web server cluster 111 and a first database server cluster 112. A second application 102 of network 100 includes a second web server cluster 121 and a second database server cluster 122. Web server clusters 111 and 121 are connected to a network to which internal users 104 have access via an enterprise intranet 105 and to which external users 103 have access via internet 106 and an intervening firewall 108. Access to the database clusters 112 and 122 is via a backend network 120 not accessible via either the internet 106 or the enterprise's intranet 105.

For purposes of illustration, first application 101 may represent a first commercial bank and second application 102 is a second commercial bank: More specifically, applications 101 and 102 represent the web presence and enterprise database of the corresponding bank. Frequently, as in the depicted example, enterprises delegate responsibility for providing and managing their IT requirements to an outside provider that is charged with, among other things, ensuring that each application (customer) has sufficient resources. FIG. 1 emphasizes that a single data center provider may support multiple enterprises, even enterprises competing in the same line of business or service.

The provider or administrator of data center 100 attempts to minimize costs by utilizing available resources in the most efficient manner possible. While first and second applications 101 and 102 may have similar characteristics, each is likely to exhibit time varying demand or loading. The varying loads of each application suggest that dynamic allocation of resources can lead to a more cost effective data center implementation than simple static provisioning (in which a server cluster is configured with sufficient resources to function at its peak expected demand). Automated provisioning is desirable to achieve the related goals of efficient resource allocation and dynamic allocation adjustment.

Figure 2:
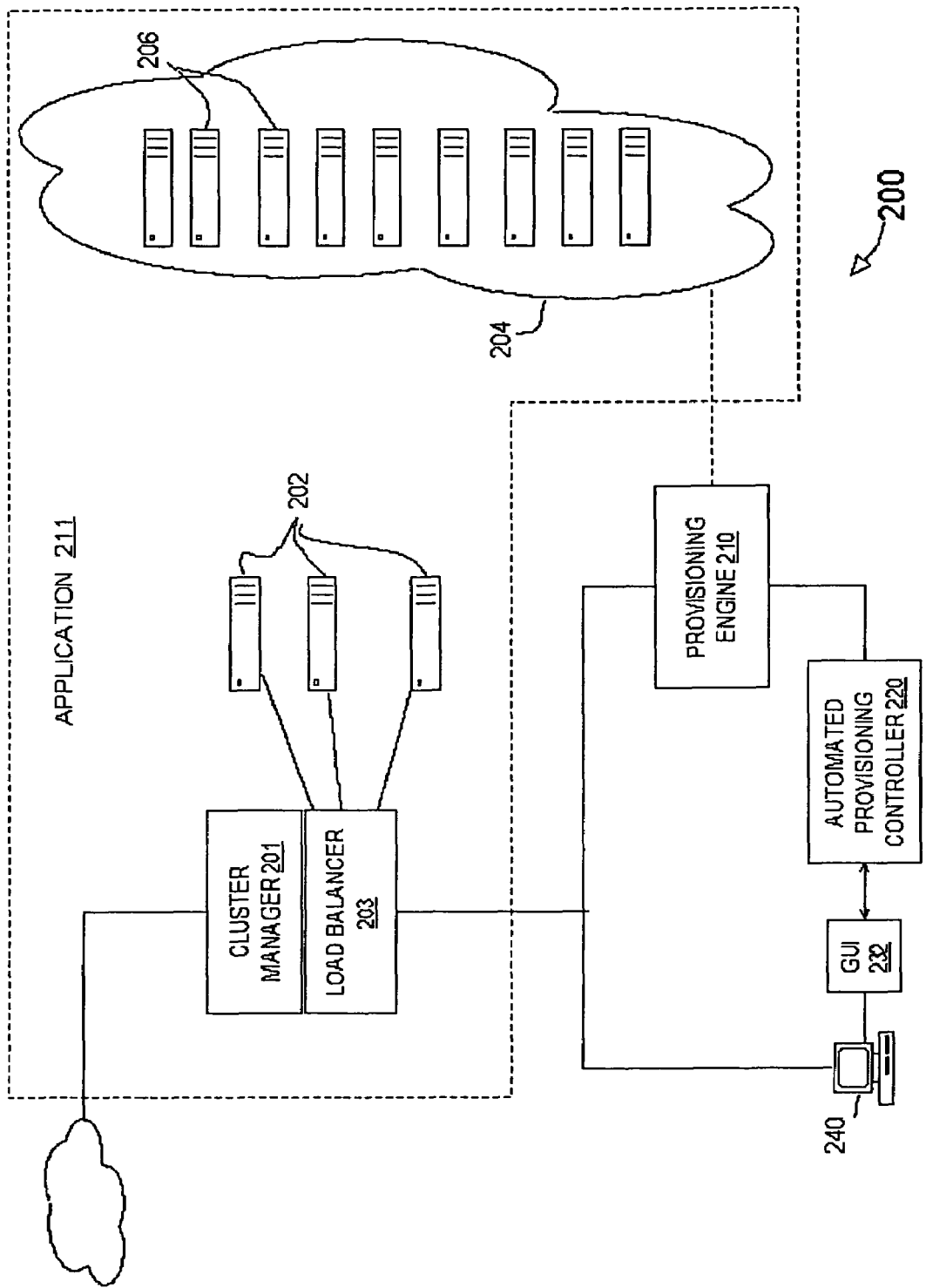
FIG. 2 is a diagram of selected elements of the data center of FIG. 1.

Referring now to FIG. 2, selected elements of a data center 200 are presented to emphasize additional details of applications 101 and 102 of FIG. 1 and to introduce automated provisioning resources according to on embodiment of the present invention. In FIG. 2, data center 200 includes a generic application 211, a provisioning engine 210, and an automated provisioning controller 220. In this example, application 211 represents either of the applications depicted in FIG. 1 (i.e., applications 111 and 121). The depicted embodiment of application 211 includes a cluster manager 201, a set of replica servers 202, and a pool 204 of available resources 206.

The available resource pool 204 preferably represents a common pool of resources that are generally available to each of the applications depicted in FIG. 1. In the depicted implementation, each resource is a server device that includes processing capability (CPU cycles), memory capacity, disk storage capacity, and I/O device capacity such as network interface cards. In other implementations, resources may be more narrow or tailored such that, for example, processors resources, memory resources, storage resources, and I/O or network resources, are each separately provisionable.

Cluster manager 201 presents a virtual IP address to the external world. Cluster manager 201 may present a unique virtual IP address for multiple clusters or applications. A primary function of cluster manager 201 is to distribute incoming requests to the replica servers 202. Replica servers 202 do the actual processing of incoming requests. The IP addresses of the replica serves 202 may be, and most likely are, hidden from the end user by cluster manager 201. In a likely implementation, the services provided by each replica server 202 are substantially equivalent. Incoming requests are distributed to replica servers 202 by a load balancer 203 according to a predetermined algorithm such as a round robin technique.

Provisioning engine 210 according to the present invention is connected to or has access to load balancer 203, the available resource pool 204, and automated provisioning controller 220. Provisioning engine 210 may be implemented in hardware, software, or a combination thereof, but is most likely largely embodied in software. Provisioning engine 210, as its name implies, represents a mechanism or means for provisioning resources within data center 200 in response to a resource request. From time to time, load balancer 203 may determine in the normal course of operation that the amount of resources allocated to sever cluster 211 is inappropriate for the current loading. When the incoming requests are outpacing the cluster's ability to process them, for example, load balancer 203 may detect a resource shortage. On the other hand, load balancer 203 may also detect when the amount of replica resources could be reduced with incurring a substantial negative impact on the application's performance.

In an automated provisioning environment, load balancer 203, in conjunction with automated provisioning controller 220, may send a message, referred to herein as a resource request, directly to provisioning engine 210 upon detecting a shortage (or excess) of allocated resources. In response to the resource request, provisioning engine 210 according to the present invention is enabled to select the available resource 206 in resource pool 204 that is best able to meet the requirements or preferences indicated in the resource request. Load balancer 203 may issue resource requests "indirectly" meaning that the resource request is delivered to a management server, represented by reference numeral 240, where a system administrator can detect the resource request and respond to the request by passing the resource request along to provisioning engine 210. The present invention is primarily directed at facilitating automated provisioning actions and automated responses to resource requests.

Automated provisioning controller 220 provides data center administrators with tools to control the manner in which automated provisioning is implemented. Moreover, automated provisioning controller 220 extends the reach of the automated provisioning to include "non-business" provisioning requirements such as maintenance-based resource requests and ad hoc resource requests for tasks such as developmental testing (these types of resource requests are referred to herein as reservation requests). In addition, automated provisioning controller 220 is preferably configured to incorporate or comply with policies (referred to herein as stabilization policies) that place constraints on the availability of resources in an effort to reduce provisioning "thrashing."

Thus, data center 100 of FIG. 1 and data center 200 of FIG. 2 include processing resources allocated to first application 101 (i.e., the resources allocated to web server cluster 111 and data base cluster 112) and processing resource allocated to second application 102. In addition, data centers 100 and 200 include a pool 204 of available resources 206 that may be allocated to either of the applications 101 or 102. A provisioning mechanism such as provisioning engine 210 is able to alter the resource allocation in response to a resource request. Importantly, as described below with respect to FIG. 3, data centers 100 and 200 also include facilities to provide a user interface that enables the user (an IT administrator most likely) to specify allocation priorities that guide the behavior of the provisioning mechanism.

Figure 3:
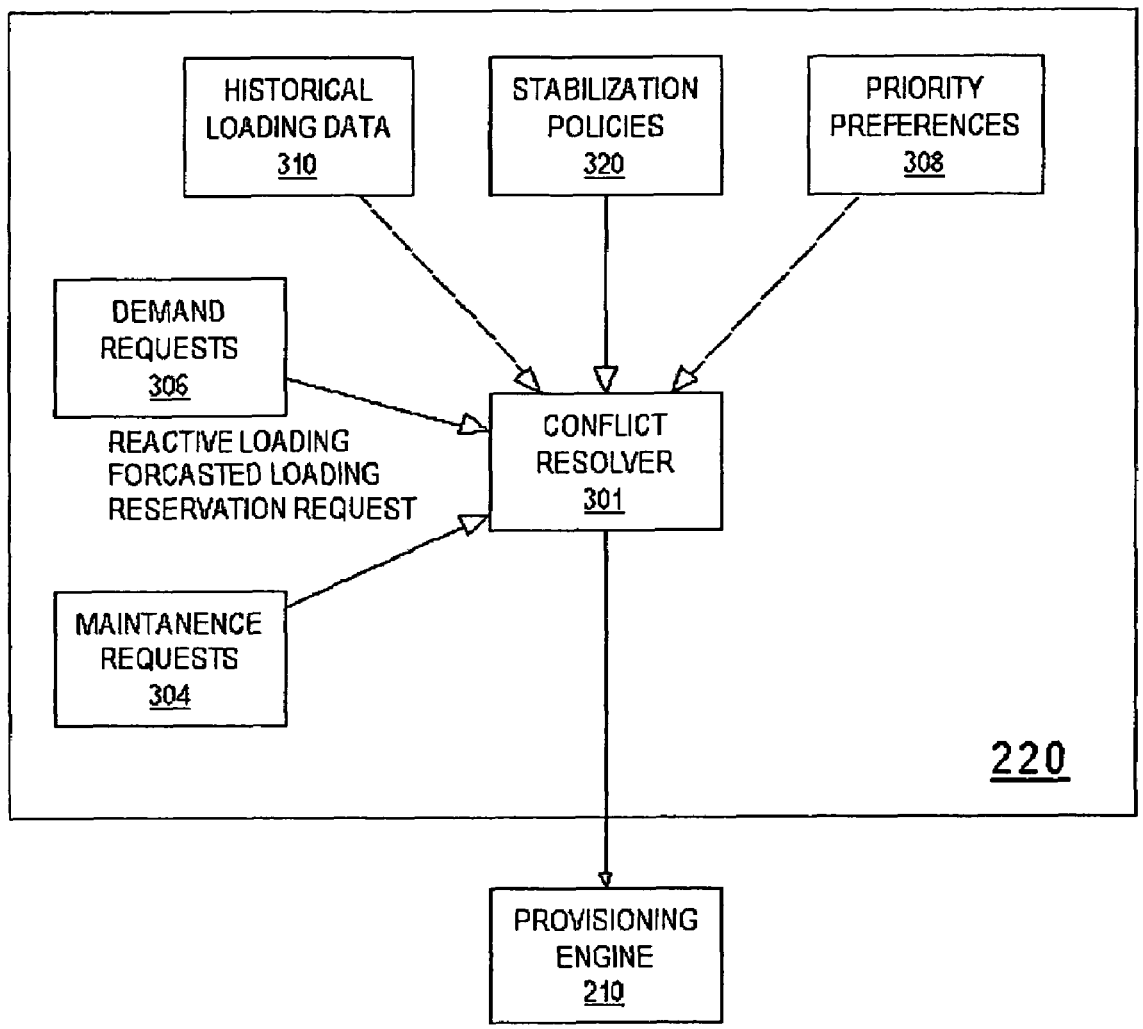
FIG. 3 is a block diagram of selected elements of an automated provisioning controller according to one embodiment of the invention.

Referring now to FIG. 3, selected elements of an embodiment of the automated provisioning controller 220 of FIG. 2 are depicted. At the heart of automated provisioning controller 220 is a conflict resolution engine 301 that receives resource requests. The resource requests may come from different sources and be of different types. Conflict resolution engine 301 has access to policies and preferences that guide automated provisioning controller 220 in determining which of multiple conflicting resource requests should be serviced.

In the depicted embodiment, conflict resolver 301 receives demand-based resource requests 306 as well as maintenance-based resource requests 304. Demand-based resource requests 306 represent a traditional type of resource request in the automated provisioning environment. Demand-based resource requests 306 refer to resource requests issued in response to a change (increase) in the loading or demand of a given application or web cluster. Thus, demand-based resource requests 306 are generally issued in response to an increase in the entity's core business area and are, therefore, generally considered to be important and high-priority requests.

In an idealized implementation, all demand-based resource requests 306 would be serviced immediately because all such requests presumably indicate that demand is outpacing the capacity of the resource allocated to process the demand. In real implementations, of course, resources are limited and there may be times when it is not possible to service two demand-based resource requests simultaneously because of a lack of available resources. An important function of automated provisioning controller 220 is prioritizing resource requests when a resource request conflict occurs.

As depicted in FIG. 3, there are different types of demand-based resource requests that conflict resolver 301 may receive and process. The different types of demand-based resource requests include reactive demand-based requests, forecasted demand-based requests, and reservation requests (which may be classified as demand-based requests for purposes of distinguishing of them from pure maintenance-based requests). Reactive demand-based requests arise when the demand or loading, typically measured as a product of the number of requests per unit of time multiplied by the average amount of data or processing required for each request, increases, whether unexpectedly or not. Forecasted demand-based requests may be generated when it is predicted, based at least in part on historical loading data 310, that demand on a particular cluster or application will increase in the future. Reactive resource requests have a high priority because they indicate an existing resource shortage. Forecasted resource requests, on the other hand, are also potentially high priority resource requests because they can be used to reduce or prevent the reactive resource requests and thereby improve stability.

In addition to demand-based resource requests, which are generally associated with the core business for which an application is established, IT administrators must make other "non-business" resource requests from time to time in order to maintain existing resources and to test or verify proposed resources. Conflict resolver 301 of automated provisioning controller 220 is configured to receive maintenance-based resource requests 304 and to resolve conflicts between two dissimilar resource request types, such as demand-based resource requests and maintenance based resource requests. Specifically, conflict resolver 301 is configured to access a set of user-specified priority preferences 308, perhaps in conjunction with other information, to resolve resource request conflicts when multiple resource requests are pending and to select one of the resource request for servicing. In addition to user-specified priority preferences 308, conflict resolver 301 may access or use historical loading data 310 and/or network stabilization policies 320 to aid in the resolution of a resource request conflict.

Stabilization policies 320 represent policies or rules that generally place constraints on the extent to which resources are available for allocation. The automated provisioning controller 220 of the present invention accesses and uses stabilization policies to provide a more stable and efficient allocation state. In the absence of stabilization policies, a potentially significant amount of allocation and re-allocation might occur, where a particular allocation is so temporary or transient that the overhead associated with allocating the resource and then re-allocating it shortly thereafter outweighs any benefit achieved during the short time when the resource was allocated.

Stabilization polices 320 according to at least one embodiment of the invention include a stabilization policy that restrains or prevents allocation of a resource that is currently scheduled for a maintenance task within a specified duration or time period. If a resource is scheduled for a mandatory maintenance task within the next fifteen minutes, for example, a stabilization policy may eliminate that resource as a candidate for allocation or re-allocation.

Another stabilization policy restrains or prevents allocation of a resource that is currently allocated to a web cluster or application that is expected or forecasted, based on historical data 310, to experience a demand surge soon (or within a specifiable duration) on the theory that de-allocating a resource from a cluster that expects to see an increase in demand is inefficient and will, in all likelihood, result in another allocation request when the cluster does experience the loading increase.

A third type of stabilization policy prevents dynamic allocation activity when a known failure has occurred. If a server on a particular cluster or application crashes unexpectedly, for example, and is therefore temporarily unavailable as a resource, loading on that cluster or application may appear artificially high for a short period, until the resource returns to functionality. A suitable stabilization policy might prevent automated provisioning controller 220 from allocating resources for any resource requests caused by such transients load spikes.

A fourth type of stabilization policy might restrain allocation of resources based on business goals, policies, or agreements. In the illustration of FIG. 1, for example, it was assumed that first application 101 and second application 102 were both commercial banks and were, presumably therefore, competitors. Either or both of these applications might require the data center provider to prevent resources that were allocated to one of the applications from being allocated to the application of a competitor, at least not without first being extensively "scrubbed."

Automated provisioning controller 220 is configured to provide a user interface that enables users to specify priorities for resolving resource request conflicts. The conflict resolution engine 301 accesses the specified priorities to resolve resource request conflicts and thereby select a resource request for servicing from among multiple pending resource requests.

Figure 4:
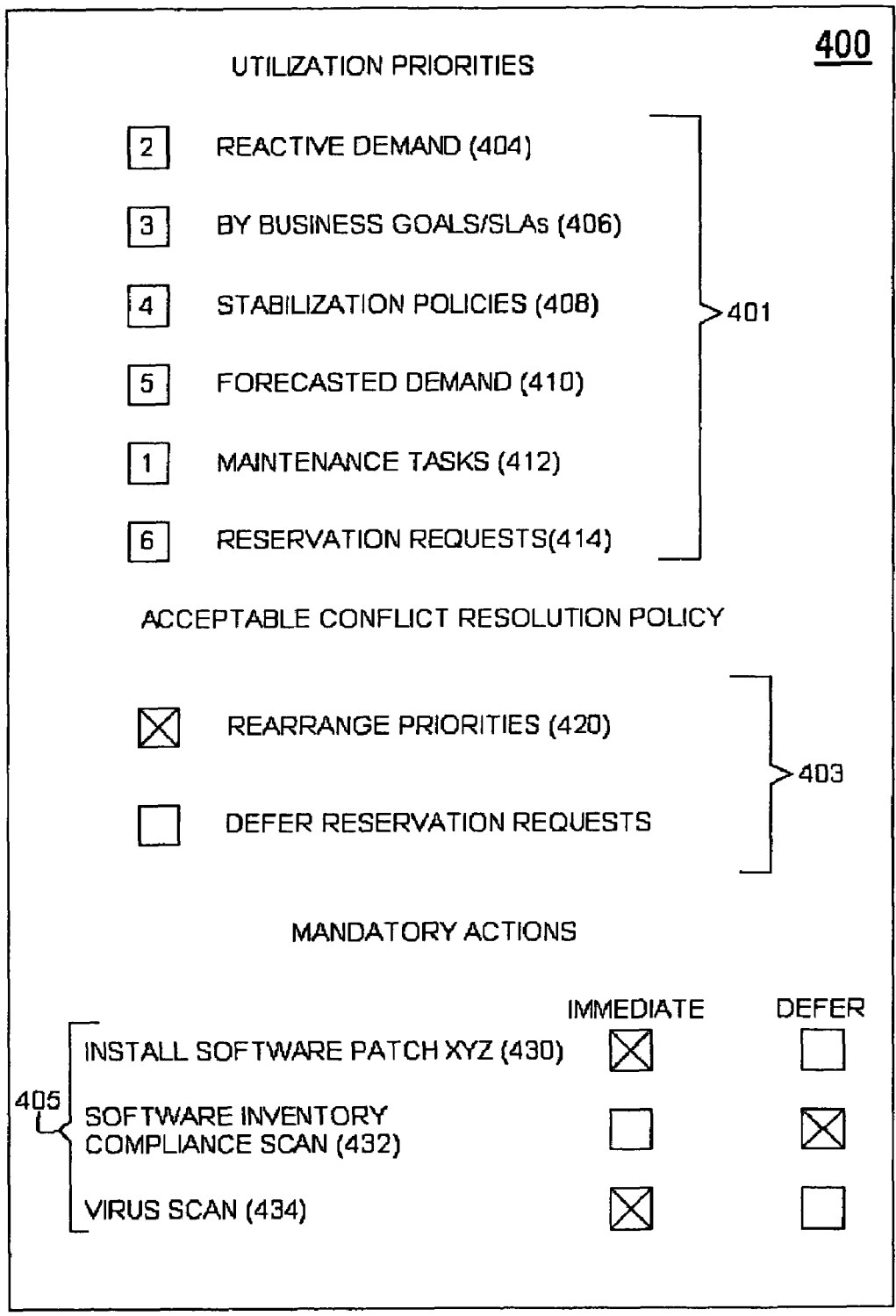
FIG. 4 is an exemplary user interface according to one embodiment of the invention.

Referring now to FIG. 4, an exemplary user interface 400 provided by automated provisioning controller 220 is depicted. In the depicted embodiment, user interface 400 includes a section 401 defining utilization priorities, a section 403 for defining acceptable conflict resolution policies, and a section 405 for inputting mandatory actions. The utilization priority section 401 includes an list of resource utilization parameters including reactive demand parameter 404, business goal parameter 406, stabilization policies 408, forecasted demand 410, maintenance parameter 412 and a reservation requests 414. This precise items in listed in section 401 is an implementation detail and other embodiments may include other parameters and exclude some of the parameters shown here.

Each utilization priority parameter is positioned next to an input box where an administrator can specify priority levels associated with the various utilization priorities. As shown in FIG. 4, for example, maintenance task parameter 412 has been assigned the highest priority (1) of all. A maintenance-based resource request operating under the parameters specified by the depicted implementation would, therefore, resolve all resource request conflicts in favor of maintenance tasks.

Referring momentarily to mandatory actions section 405, a list of maintenance related tasks are specified here. In implementations where maintenance tasks are not awarded the highest priority as in FIG. 4, the mandatory action section permits an administrator a form of manual control by specifying certain actions that the administrator can "force." Thus, for example, the "IMMEDIATE" box checked next to the install software patch XYZ (430) and next to virus scan (434) provide a mechanism by which the administrator can perform these tasks regardless of the priority given to maintenance tasks in general.

Returning to utilization priority section 401, the parameters shown are prioritized by the administrator to guide the manner in which automated provisioning controller 220 uses provisioning engine 210 to service resource requests and perform resource allocations. Reactive demand parameter 404 has been assigned a priority level of (2). This priority level indicates the relative importance of the corresponding parameter assigned by administrator. A high priority for reactive demand might be appropriate, for example, for a cluster or application that does not exhibit great predictability in its demand patterns. The relatively low priority level (5) assigned to forecasted demand parameter 410 is consistent with this characteristic. If a pair of demand-based resource requests occur and one of them is a reactive demand resource request and the other is a forecasted demand resource request and only a single resource is available, the reactive demand resource request will prevail by virtue of its higher priority level.

The stabilization policy parameter 408 enables the administrator some control against instability, high resource re-allocation rates, and the like. The higher the priority level for the stabilization policy parameter 408, the more stable the data center will be, possibly at the cost of lower performance when large numbers of resource requests go unfilled because of an overbearing stabilization policy.

Utilization priority section 401 includes a business goal/SLA parameter 406 that permits the administrator to indicate how much weight should be given to service level agreements. If the SLA parameter 406 is assigned a relatively high priority, applications and customers with stronger or broader service level agreements will tend to prevail in their resource requests.

The acceptable conflict resolution policy section provide administrator with an additional level of control over the data center provisioning implementation. By checking appropriate boxes in section 403, an administrator can indicate policies or actions that the resolution engine 301 might pursue as an alternative to resolution based strictly on priority level. In the depicted illustration, an administrator has permitted the automated provisioning controller 220 to rearrange priorities in section 401 in response to a resource request conflict. If, for example, a forecasted demand resource requests is observed, but cannot be serviced because of a stabilization policy having a higher priority, the rearrange-priority-levels parameter 420 enables automated provisioning controller 220 to alter the priority in an effort to service the request (assuming that no other higher priority requests are pending).

User interface 400 as shown in FIG. 4 thus provides users with a tool that permits them to monitor or control automated provisioning. In addition, the utilization priority section 401 desirably includes parameters or line items for a diverse set of parameters including demand-based priorities and for maintenance- or non-business-based parameters such as maintenance tasks 412 and reservation requests 414 as well as parameters for stabilization policies, all desirably increasing the amount of control an administrator of an automated provisioning environment has without sacrificing desirable automation.

As stated previously, portions of the invention may be entirely or partially embodied as a set or sequence of computer executable instructions for managing data centers that support automated provisioning. In such embodiments, the program instructions are likely stored on a computer readable medium such as a hard disk while, during times when the instructions are being executed by a microprocessor, the instructions may be stored in a volatile storage element such as system memory or cache memory. In other embodiments, the present invention is a service provided to customers where the service is configuring or enabling the customer's application to support dynamic, automated, user-controllable provisioning.

Figure 5:
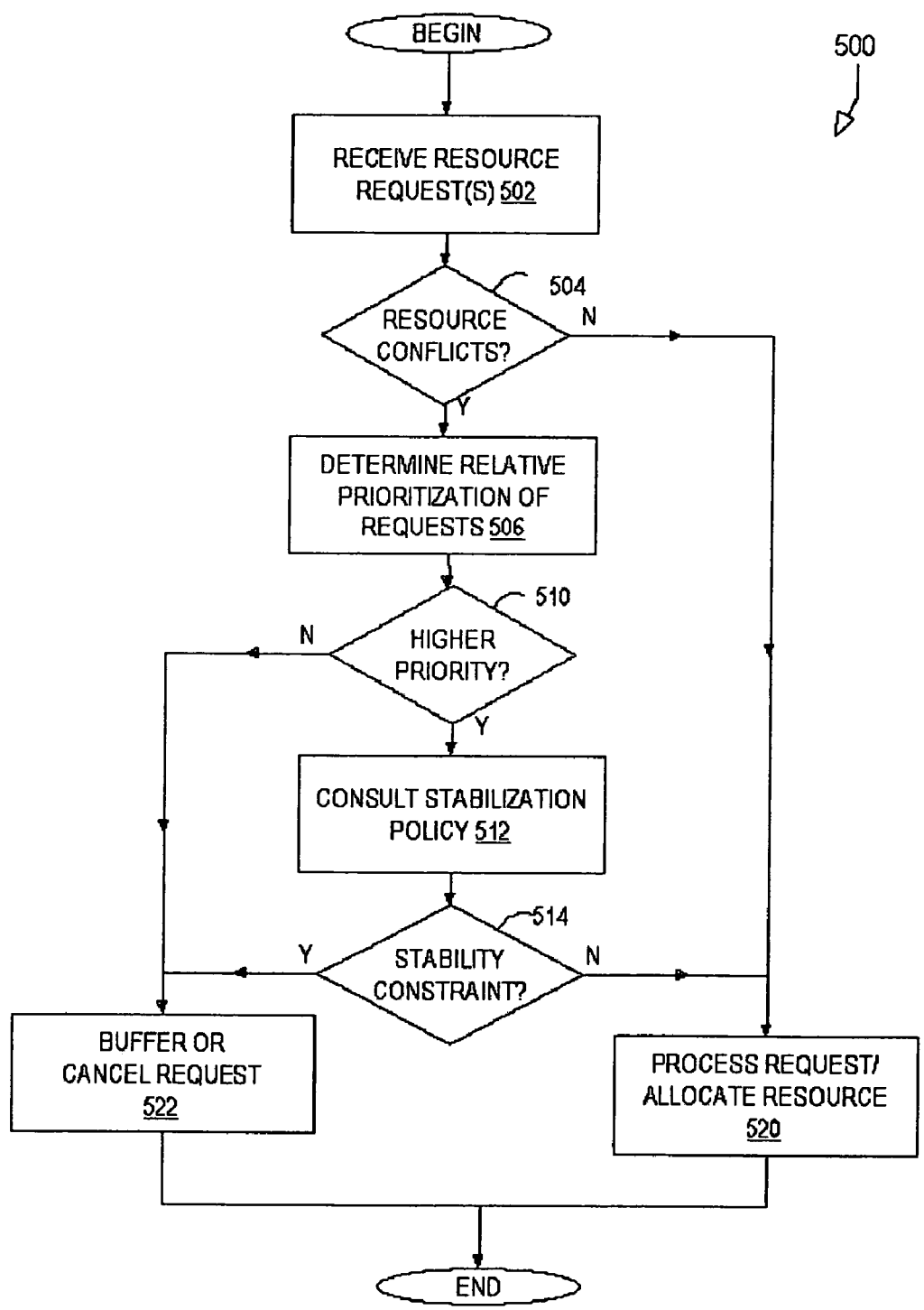
FIG. 5 is a flow diagram of a method and service for managing resources in a data center environment according to one embodiment of the invention.

Referring to FIG. 5, a flow diagram of a method 500 of managing resource allocation in a data center such as data center 100 or 200 is depicted. Method 500 is illustrative of the software and service referred to in the preceding paragraph. More specifically, method 500 represents the operations that the computer software will perform during execution. Alternatively, method 500 represents the functionality that will be provided to a customer's data center by the service embodiment of the present invention.

In FIG. 5, resource requests are received in block 502. The automated provisioning controller first determines if the pending request represents a represents or results in a resource request conflict. The resource request conflict most likely indicates that two or more resource requests are pending, but less than all of the requests can be serviced with the presently available number of amount of resources. If no resource request conflict exists, a received request is serviced in block 520.

If a resource requests does produce a conflict, however, the resolution conflict engine 301 is invoked, first to determine (block 506) the relative priority of the conflicting requests and to determine and to consult a stabilization policy (block 512). If a pending resource request enjoys the highest priority (as determined in block 510) among the pending requests and no stabilization policy prevents the request from being serviced (as determined in block 514), the request is serviced in block 520. If a higher priority request or a stabilization policy prevents the request from being serviced, the request may be canceled or buffered in block 522.

It will be apparent to those skilled in the art having the benefit of this disclosure that the present invention contemplates a method of selecting an optimal resource in response to a resource request. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing network, comprising:
    processing resources allocated to a first application;
    processing resources allocated to a second application;
    a pool of available resources;
    provisioning means for altering the allocation of resources responsive to a resource request; and
    interface means enabling a user to specify allocation priorities that guide the provisioning means responsive to two or more resource requests creating a resource request conflict.

2. The network of claim 1, wherein the interface means enable the user to specify a priority for a demand-based resource request.

3. The network of claim 2, wherein the interface means enable the user to specify a priority for a forecasted demand-based resource request and for a reactive demand-based resource request.

4. The network of claim 2, wherein the interface means enable the user to evaluate demand-based resource requests in view of existing service level agreements.

5. The network of claim 2, wherein the interface means enable the user to specify a priority for a maintenance-based resource request.

6. The network of claim 2, wherein the interface means enable the user to a specify a priority for a reservation-based resource request.

7. The network of claim 1, wherein the interface means guide the provisioning means based, in part, upon a stabilization policy corresponding to the network.

8. The network of claim 7, wherein the stabilization policy restrains allocation of a resource scheduled for a maintenance task within a specified duration.

9. The network of claim 7, wherein the stabilization policy has access to historical loading information and wherein the stabilization policy prevents allocation of a resource within a specified duration of a forecasted surge in loading, wherein the expected surge is derived from the historical demand.

10. The network of claim 7, wherein the stabilization policy prevents allocation of a resource within a specified duration of detecting a failed resource on a node.

11. A computer program product, comprising:
    computer code means for provisioning for altering the allocation resources within the network responsive to a resource request; and
    computer code means for enabling a user to specify priorities for resolving a resource request conflict caused by multiple pending resource requests; and
    computer code means for accessing the user specified priorities to resolve a resource request conflict and select a resource request from the multiple pending resource requests.

12. The computer program product of claim 11, wherein the code means for enabling the user to specify priorities include code means for enabling the user to specify a priority level for a demand-based resource request.

13. The computer program product of claim 12, wherein the enabling code means include code means enabling the user to specify a priority level for achieving service level agreement conditions.

14. The computer program product of claim 12, wherein the enabling code means include code means enabling the user to specify a priority for a maintenance-based resource request.

15. The computer program product of claim 11, wherein the enabling code means include code means for resolving conflicts based, in part, upon a resource stabilization policy of the network.

16. The computer program product of claim 15, wherein the stabilization policy prevents allocation of a resource scheduled for a maintenance task within a specified duration.

17. The computer program product of claim 15, wherein the stabilization policy has access to historical loading information and wherein the stabilization policy prevents deallocation of a resource within a specified duration of a forecasted surge in loading, wherein the expected surge is derived from the historical demand.

18. A service for enabling automated provisioning on a data processing network for altering the allocation of resources, comprising providing the network with access to an automated provisioning controller, the controller being configured to enable a user to specify resource allocation priorities and further configured to use the user-specified priorities, in conjunction with a resource stabilization policy constraining resource allocation in a specified manner, to resolve conflicting resource requests.

19. The service of claim 18, wherein the resource allocation priorities include priorities for demand-based resource requests and maintenance-based resource requests.

20. The service of claim 19, wherein the stabilization policy includes a policy for constraining allocation of a resource based on forecasted demand and a policy for constraining allocation of a resource based on a scheduled maintenance task.

* * * * *